United States Patent
Ghanta

(10) Patent No.: US 10,604,625 B2
(45) Date of Patent: Mar. 31, 2020

(54) METHOD OF FORMING HIGH MOLECULAR WEIGHT POLY(PHENYLENE ETHER), POLY(PHENYLENE ETHER) FORMED THEREBY, AND FIBER AND ARTICLE COMPRISING THE POLY(PHENYLENE ETHER)

(71) Applicant: SABIC GLOBAL TECHNOLOGIES B.V., Bergen Op Zoom (NL)

(72) Inventor: Madhav Ghanta, Delmar, NY (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 60 days.

(21) Appl. No.: 16/062,987

(22) PCT Filed: Nov. 21, 2016

(86) PCT No.: PCT/US2016/063004
§ 371 (c)(1),
(2) Date: Jun. 15, 2018

(87) PCT Pub. No.: WO2017/105782
PCT Pub. Date: Jun. 22, 2017

(65) Prior Publication Data
US 2019/0002636 A1    Jan. 3, 2019

Related U.S. Application Data

(60) Provisional application No. 62/268,626, filed on Dec. 17, 2015.

(51) Int. Cl.
*C08G 65/44* (2006.01)
*C08L 71/12* (2006.01)
(Continued)

(52) U.S. Cl.
CPC ............. *C08G 65/44* (2013.01); *B01D 53/22* (2013.01); *B01D 53/228* (2013.01); *B01D 69/08* (2013.01);
(Continued)

(58) Field of Classification Search
CPC ........... B01D 2053/224; B01D 53/228; B01D 69/08; B01D 71/52; C08G 65/44;
(Continued)

(56) References Cited

U.S. PATENT DOCUMENTS 3,306,874 A    2/1967 Hay
3,838,102 A    9/1974 Bennett et al.
(Continued)

FOREIGN PATENT DOCUMENTS

JP    2004352988 A    12/2004
JP    2007217657 A    8/2007
(Continued)

OTHER PUBLICATIONS

Andis "A New Method for Synthesis of Poly (2,6-dimethyl-1,4-phenylene oxide) and Poly (2,6-diphenyl-1,4-phenyl oxide"; J. of Chem.; 2013; Article ID 856928; pp. 1-4; http://dx.doi.org/10.1155/2013/856928.
(Continued)

*Primary Examiner* — Camie S Thompson
(74) *Attorney, Agent, or Firm* — Cantor Colburn LLP

(57) ABSTRACT

A poly(phenylene ether) can be prepared by a method that includes reacting 2,6-dimethylphenol in the presence of toluene, oxygen, copper ion, bromide ion, and N,N'-di-tert-butylethylenediamine to form a poly(phenylene ether). The mole ratio of 2,6-dimethylphenol to copper ion is 160:1 to 300:1, the mole ratio of N,N'-di-tert-butylethylenediamine to copper ion is 1.5:1 to 3:1, and the mole ratio of atomic oxygen to 2,6-dimethylphenol is 0.9:1 to 1.5:1. The process
(Continued)

can produce poly(phenylene ether) having a high molecular weight and a high incorporated amine content.

13 Claims, 1 Drawing Sheet

(51) Int. Cl.
| | | |
|---|---|---|
| *B01D 53/22* | (2006.01) | |
| *B01D 69/08* | (2006.01) | |
| *B01D 71/52* | (2006.01) | |

(52) U.S. Cl.
CPC ............ *B01D 71/52* (2013.01); *C08L 71/123* (2013.01); *B01D 2053/224* (2013.01); *C08L 2203/12* (2013.01)

(58) Field of Classification Search
CPC ...... C08L 2203/12; C08L 71/12; C07C 46/08; C07C 39/15; C08J 2371/12; C08F 283/03; B01J 2531/16
USPC ........ 428/359, 398; 528/212, 215, 217, 495; 156/212, 215, 217, 218, 86, 492; 544/64; 252/404; 524/434; 546/2; 556/110; 502/318
See application file for complete search history.

(56) References Cited

U.S. PATENT DOCUMENTS

| | | | |
|---|---|---|---|
| 3,852,388 | A | 12/1974 | Kimura |
| 3,951,917 | A | 4/1976 | Floryan et al. |
| 4,039,510 | A | 8/1977 | Cooper et al. |
| 4,110,311 | A | 8/1978 | Cooper et al. |
| 4,116,939 | A | 9/1978 | Cooper et al. |
| 4,486,202 | A | 12/1984 | Malon et al. |
| 4,944,775 | A | 7/1990 | Hayes |
| 5,069,818 | A | 12/1991 | Aycock et al. |
| 5,181,940 | A | 1/1993 | Bikson et al. |
| 5,215,554 | A | 6/1993 | Kramer et al. |
| 5,679,133 | A | 10/1997 | Moll et al. |
| 5,779,897 | A | 7/1998 | Kalthod et al. |
| 5,880,221 | A | 3/1999 | Liska et al. |
| 6,323,300 | B1 | 11/2001 | Kita et al. |
| 6,407,202 | B1 | 6/2002 | Braat et al. |
| 6,472,499 | B1 | 10/2002 | Braat et al. |
| 6,586,567 | B2 | 7/2003 | Takeda et al. |
| 6,897,282 | B2 | 5/2005 | Freshour et al. |
| 7,025,377 | B2 | 4/2006 | Ryu |
| 7,229,580 | B2 | 6/2007 | Yuan |
| 7,541,421 | B2 | 6/2009 | Carrillo et al. |
| 8,025,158 | B2 * | 9/2011 | Delsman .............. C08G 65/485 210/500.23 |
| 8,722,839 | B2 | 5/2014 | Hossan |
| 2007/0106051 | A1 | 5/2007 | Carrillo et al. |
| 2008/0071059 | A1 | 3/2008 | Nishide et al. |
| 2009/0221967 | A1 | 8/2009 | Delsman et al. |
| 2010/0021360 | A1 | 1/2010 | Leenders et al. |
| 2015/0033667 | A1 | 2/2015 | Carrillo et al. |

FOREIGN PATENT DOCUMENTS

| | | |
|---|---|---|
| WO | 0212370 A1 | 2/2002 |
| WO | 2006065519 A1 | 6/2006 |

OTHER PUBLICATIONS

Cooper et al "Block Copolymers by Oxidative Couping of Phenols"; Macromol; 1970; vol. 3(1); pp. 101-102.
Fukuhara et al "Synthesis of thermosetting poly(phenylene ether) containing allyl groups"; Polymer; 2004; 45; pp. 843-847.
Hay "Poly(phenylene oxide)s and poly(arylene ether)s derived from 2,6-diarylphenols"; Prog. Polym. Sci.; 1999; 24; pp. 45-80.
Hay "Polymerization by Oxidative Coupling, VI. Oxidation of o-Cresol"; Polymer Letter; 1965; vol. 3; pp. 887-889.
Hay "Poly(2,6-diphenyl-1,4-phenylene oxide)"; Macromol; 1969; vol. 2; No. 1; pp. 107-108.
Hay et al "Poly (2,6-diaryl-1,4-phenylene oxides)"; Macromol; 1970; vol. 3; No. 5; pp. 533-535.
Hay, "Polymerization by Oxidative Coupling, II. Oxidation of 2,6-Disubstituted Phenols," Journal of Polymer Science;1962, pp. 581-591: vol. 58.
Higashimura et al "'Radical-controlled' oxidative polymerization of o-cresol catalyzed by u-n2:n2-peroxo dicopper(II) complex"; Applied Catalysis A: General 194-195; 2000; pp. 427-433.
Ikeda et al "A new crosslinable polyphenol from a renewable resource"; Macromol. Rapid Commun.; 2000; 21; pp. 496-499.
International Search Report for International Application No. PCT/US2016/063004, International Filing Date Nov. 21, 2016, dated Feb. 16, 2017, 5 pages.
Nunoshige et al "Efficient Oxidative Coupling Polymerization for Synthesis of Thermosetting Poly(phenylene ether) Copolymer with a Low Dielectric Loss"; J. of Poly. Sci. Part A. Poly. Chem.; 2008; vol. 46; pp. 5278-5282.
Ramya et al "Poly(phenylene oxide)-Based Polymer Electrolyte Membranes for Fuel-Cell Applications"; J. of Applied Poly. Sci.; 2003; vol. 88; pp. 307-311.
Shibasaki et al "Oxidative Coupling Polymerization of Substituted Phenols with a Copper Amine Catalyst Immobilized within Mesoporous Silica"; Macromol. Symp.; 2006; 245-246; pp. 87-92.
Smid et al.; "The formation of asymmetric hollow fibre membranes for gas separation, using PPE of different intrinsic viscosities"; Journal of Membrane Science, 64, 1991, pp. 121-128.
Vishnupriya et al "Synthesis and Characterization of Sulfonated Poly (phenylene oxides) as Membrane Fuel Cells"; J. of Applied Poly. Sci.; 2002; vol. 83; pp. 1792-1798.
White, D.M. et al., "Polymerization by oxidative coupling. IV. Synthesis and Properties of poly(2-methyl-6-phenylphenylene ether)", J. of Poly. Sci. Part A-1: Poly. Chem., 1972, 10 (6), 1565-1578.
Written Opinion for International Application No. PCT/US2016/063004, International Filing Date Nov. 21, 2016, dated Feb. 16, 2017, 5 pages.
Yang, Hu et al., "Fluorine Substituent Effect on Poly(2,6-diphenyl-1,4-phenylene ether)" J. Poly. Sci, Part A: Poly. Chem., 1993, vol. 31, 2015-2029.
Yang, Hu et al., "The remarkable effect of fluorine substituents on the properties of poly(2,6-diphenyl-1,4-phenylene ether) and Poly (aryl ether)s" J. Poly. Sci. Part A: Poly. Chem., 1993, 31 (7), 1907.

* cited by examiner

METHOD OF FORMING HIGH MOLECULAR WEIGHT POLY(PHENYLENE ETHER), POLY(PHENYLENE ETHER) FORMED THEREBY, AND FIBER AND ARTICLE COMPRISING THE POLY(PHENYLENE ETHER)

CROSS-REFERENCE TO RELATED APPLICATIONS

This application is a National Stage application of PCT/US2016/063004, filed Nov. 21, 2016, which claims the benefit of U.S. Provisional Application No. 62/268,626, filed Dec. 17, 2015, both of which are incorporated by reference herein in their entirety.

BACKGROUND OF THE INVENTION

Poly(phenylene ether)s are a class of thermoplastics known for excellent water resistance, dimensional stability, and inherent flame retardancy, as well as outstanding dielectric properties over a wide frequency and temperature range. Properties such as strength, stiffness, chemical resistance and heat resistance can be tailored by blending poly(phenylene ether)s with various other plastics in order to meet requirements of a wide variety of consumer products, for example, fluid engineering parts, electrical enclosures, automotive parts, and insulation for wire and cable.

High molecular weight poly(phenylene ether)s are used to form hollow fiber membranes capable of separating the oxygen and nitrogen components of air. One method of preparing high molecular weight poly(phenylene ether)s is described in U.S. Pat. No. 8,025,158 to Delsman et al. However, there is a desire for a poly(phenylene ether) preparation method capable of producing a product polymer with low residual copper content, a narrow molecular weight distribution, and a high content of incorporated amine.

Brief Summary of Embodiments of the Invention

One embodiment is a method of forming a poly(2,6-dimethyl-1,4-phenylene ether), comprising: reacting 2,6-dimethylphenol in the presence of toluene, oxygen, copper ion, bromide ion, and N,N'-di-tert-butylethylenediamine to form a poly(2,6-dimethyl-1,4-phenylene ether); wherein the mole ratio of 2,6-dimethylphenol to copper ion is 160:1 to 300:1, the mole ratio of N,N'-di-tert-butylethylenediamine to copper ion is 1.5:1 to 3:1, and the mole ratio of atomic oxygen to 2,6-dimethylphenol is 0.9:1 to 1.5:1.

Another embodiment is a poly(2,6-dimethyl-1,4-phenylene ether) having an intrinsic viscosity of 1.5 to 2.5 deciliters per gram, and an amino group content of 0.8 to 1.2 weight percent, based on the weight of the poly(2,6-dimethyl-1,4-phenylene ether).

Another embodiment is a fiber comprising the poly(2,6-dimethyl-1,4-phenylene ether).

Another embodiment is an article comprising the poly(2,6-dimethyl-1,4-phenylene ether).

These and other embodiments are described in detail below.

DETAILED DESCRIPTION OF THE INVENTION

Figure 1:
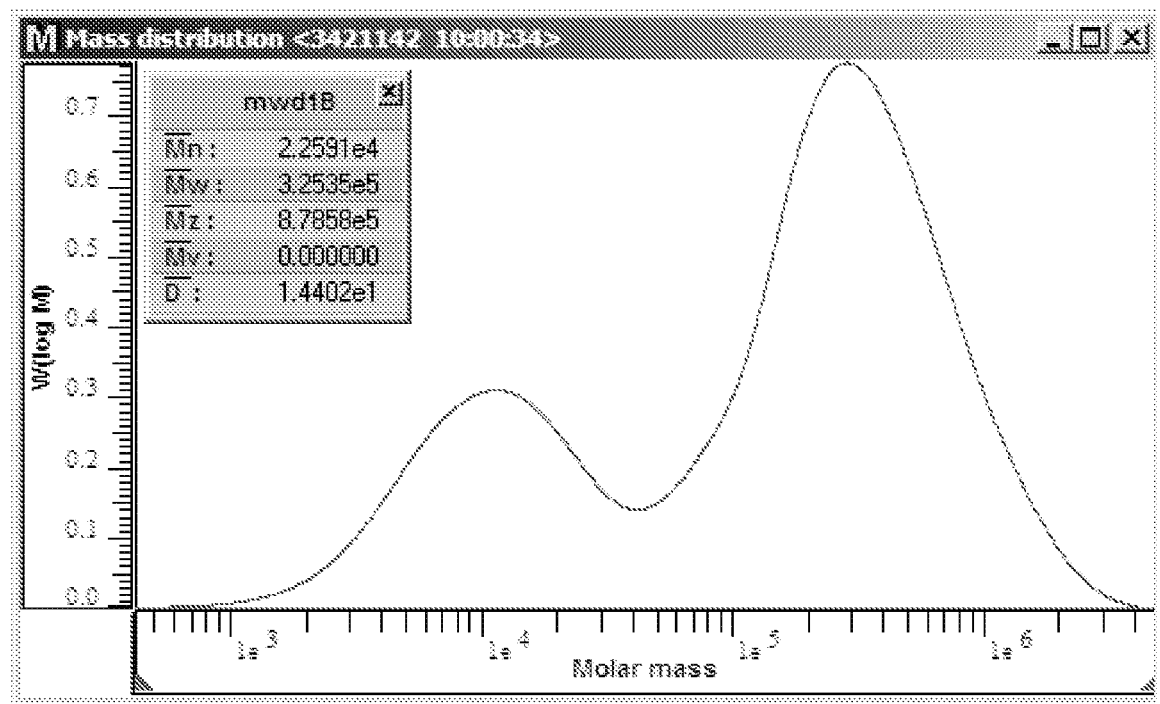
FIG. 1 is a gel permeation chromatogram showing the molecular weight distribution of a comparative poly(2,6-dimethyl-1,4-phenylene ether).

The present inventor has determined that a poly(2,6-dimethyl-1,4-phenylene ether) with low residual copper content, a narrow molecular weight distribution, and a high content of incorporated amine can be prepared by a method with specific mole ratios of monomer to copper, diamine ligand to copper, and oxygen to monomer.

One embodiment is a method of forming a poly(2,6-dimethyl-1,4-phenylene ether), comprising: reacting 2,6-dimethylphenol in the presence of toluene, oxygen, copper ion, bromide ion, and N,N'-di-tert-butylethylenediamine to form a poly(2,6-dimethyl-1,4-phenylene ether); wherein the mole ratio of 2,6-dimethylphenol to copper ion is 160:1 to 300:1, the mole ratio of N,N'-di-tert-butylethylenediamine to copper ion is 1.5:1 to 3:1, and the mole ratio of atomic oxygen to 2,6-dimethylphenol is 0.9:1 to 1.5:1.

Toluene is a solvent and can, in some embodiments, be the only solvent. In this context it will be understood that amine reagents and reaction product water are not considered solvents.

2,6-Dimethylphenol, also known as 2,6-xylenol, is the monomer that is oxidatively polymerized to form the poly(2,6-dimethyl-1,4-phenylene ether). The concentration of 2,6-dimethylphenol in the reaction mixture is expressed as percent solids, which is defined as the weight of 2,6-dimethylphenol divided by the sum of the weights of 2,6-dimethylphenol and toluene. In some embodiments, the percent solids is 5 to 15 weight percent. Within this range, the percent solids can be 8 to 14 weight percent or 9 to 13 weight percent or 10 to 12 weight percent, or 11 to 15 weight percent. The first stage of oxidative polymerization reaction, commonly referred to as the exothermic stage, is typically initiated in the presence of 1 to 10 weight percent of the total 2,6-dimethylphenol, with the remainder added over time during the same stage.

Oxygen, which refers to molecular oxygen ($O_2$), is an oxidant required for oxidative polymerization of 2,6-dimethylphenol. In the method, oxygen is added to the reaction mixture in a fixed molar ratio relative to added 2,6-dimethylphenol. Specifically, the mole ratio of atomic oxygen (O) to 2,6-dimethylphenol is 0.9:1 to 1.5:1. Within this range, the mole ratio can be 1:1 to 1.45:1, or 1:1 to 1.4:1.

Copper ion, which refers to total copper ion, including uncomplexed $Cu^+$, complexed $Cu^+$, uncomplexed $Cu^{2+}$, complexed $Cu^{2+}$, and combinations thereof, catalyzes oxidative polymerization of 2,6-dimethylphenol. It will be understood that the oxidative nature of the polymerization requires that the copper ion shuttles between the +1 and +2 oxidation states, and that the copper ion can be in either of these oxidation states when initially provided. Suitable sources of copper ion include cuprous chloride, cupric chloride, cuprous bromide, cupric bromide, cuprous sulfate, cupric sulfate, cuprous acetate, and cupric acetate. The concentration of copper ion in the reaction mixture is expressed as a mole ratio relative to 2,6-dimethylphenol. Specifically, the mole ratio of 2,6-dimethylphenol to copper ion is 160:1 to 300:1. Within this range, the ratio can be 180:1 to 250:1, or 190:1 to 240:1.

Bromide ion complexes with copper ion. It will be understood that "bromide ion" refers to total bromide ion (including free and complexed forms). Sources of bromide ion include hydrobromic acid, cuprous bromide, cupric bromide, alkali metal bromides (including sodium bromide and potassium bromide), alkaline earth metal bromides, and combinations thereof. The concentration of bromide ion in the reaction mixture is expressed as a mole ratio relative to copper ion. Typically, the mole ratio of bromide ion to copper ion is 1:1 to 20:1. Within this range, the ratio can be 2:1 to 10:1.

N,N'-Di-tert-butylethylenediamine forms a complex with copper ion that is an active catalyst for oxidative polymerization of 2,6-dimethylphenol. It will be understood that the term "N,N'-di-tert-butylethylenediamine" refers to total N,N'-di-tert-butylethylenediamine (including free and complexed forms). The concentration of N,N'-di-tert-butylethylenediamine can be expressed as a mole ratio relative copper ion. Specifically, the mole ratio of N,N'-di-tert-butylethylenediamine to copper ion is 1.5:1 to 5:1. Within this range, the ratio can be 1.7:1 to 2.5:1, or 1.9:1 to 2.2:1, or 1.95:1 to 2.2:1, or 1.9:1 to 4:1.

In addition to the N,N'-di-tert-butylethylenediamine, the reaction mixture can contain a secondary monoamine (e.g., di-n-butylamine), a tertiary monoamine (e.g., dimethyl-N-butylamine), or both. For example, the oxidative reaction of the 2,6-dimethylphenol can be conducted in the presence of di-n-butylamine at 2 to 8 weight percent, and dimethyl-N-butylamine at 0.5 to 2 weight percent, both based on the total weight of 2,6-dimethylphenol.

The oxidative reaction of the 2,6-dimethylphenol can be conducted in the presence of a phase transfer agent. A currently preferred chain transfer agent is N,N,N'N'-didecyldimethyl ammonium chloride. When present, the chain transfer agent can be used in an amount of 10 to 25 weight percent, based on the weight of N,N'-di-tert-butylethylenediamine.

The oxidative polymerization of 2,6-dimethylphenol can be separated into two stages. The first or "exothermic" stage, mentioned above, occurs as the reaction is initiated by introduction of oxygen to a solution containing a small amount of the 2,6-dimethylphenol and continues through the addition of the remaining 2,6-dimethylphenol. As suggested by the name, the exothermic stage is characterized by the release of heat, and the reaction mixture is typically cooled to maintain a temperature of 15 to 35° C. Within this range, the temperature can be 20 to 30° C., or 20 to 25° C. The reaction conditions described above are for the exothermic stage of the polymerization.

During the second or "build" stage of polymerization, the reaction mixture is typically maintained at a temperature of 20 to 80° C. Within this range, the temperature can be 30 to 70° C., specifically 35 to 55° C. In some embodiments, reagent concentrations other than oxygen are not actively adjusted between the exothermic phase and the build phase, and during the build phase. That is, no action is taken to add to or reduce the concentrations of 2,6-dimethylphenol, copper ion, N,N'-di-tert-butylethylenediamine, di-N-butylamine, or dimethyl-N-butylamine During the build stage, the oxygen flow rate is typically reduced to 15 to 35 percent of its flow rate during the exothermic stage.

The build stage and the oxidative polymerization reaction as a whole are terminated when a chelating agent is added to the reaction mixture to chelate the copper ion and thereby destroy the active catalyst. Copper chelation is a well-known step in poly(phenylene ether) synthesis, and suitable chelating agents are known. These include ethylenediaminetetraacetic acid and its alkali metal salts, and nitrilotriacetic acid and its alkali metal salts. A currently preferred chelating agent is trisodium nitrilotriacetate. The chelating agent can be added in solid form, or as a solution (e.g., an aqueous solution). Addition of the chelating agent terminates the build stage and initiates the equilibration stage. Due in part to the two-phase nature of the reaction mixture (organic and aqueous), complexation of copper ion by the chelating agent is not instantaneous and requires significant time at elevated temperature. For example, the equilibration stage may be conducted at a temperature of 45 to 75° C. for a time of 10 to 200 minutes. Within these ranges, the temperature can be 50 to 70° C., and the time can be 20 to 45 minutes. An undesirable side-effect of the equilibration stage can be that over time the poly(2,6-dimethyl-1,4-phenylene ether) intrinsic viscosity decreases, and the dispersity increases. There can therefore be a trade-off between reducing the residual copper content of the isolated poly(2,6-dimethyl-1,4-phenylene ether), and adversely affecting its molecular weight characteristics. Methods of reducing adverse effects of the equilibration step on molecular weight characteristics are known. See, for example, U.S. Pat. No. 8,025,158 to Delsman et al.

In a specific embodiment of the method, the mole ratio of 2,6-dimethylphenol to copper ion is 180:1 to 250:1, the mole ratio of N,N'-di-tert-butylethylenediamine to copper ion is 1.9:1 to 2.2:1, the mole ratio of atomic oxygen to 2,6-dimethylphenol is 1.2:1 to 1.4:1, and the poly(2,6-dimethyl-1,4-phenylene ether) has an intrinsic viscosity of 1.5 to 2.5 deciliters per gram, and an incorporated amine content of 0.8 to 1.2 weight percent.

The method is useful for preparing poly(2,6-dimethyl-1, 4-phenylene ether) having high intrinsic viscosity and high amino group content. In some embodiments, the poly(2,6-dimethyl-1,4-phenylene ether) has an intrinsic viscosity of 1.5 to 2.5 deciliters per gram, and an amino group content of 0.8 to 1.2 weight percent, based on the weight of the poly(2,6-dimethyl-1,4-phenylene ether). Intrinsic viscosity can be determined at 25° C. in chloroform by Ubbelohde viscometer Amino group content can be determined by proton nuclear magnetic resonance spectroscopy ($^1$H NMR), as described in the working examples.

The poly(2,6-dimethyl-1,4-phenylene ether) prepared by the method can also have a narrow molecular weight distribution relative to high molecular weight poly(2,6-dimethyl-1,4-phenylene ether)s prepared by conventional methods. For example, the poly(2,6-dimethyl-1,4-phenylene ether) has a dispersity of 2.5 to 6. Within this range, the dispersity can be 3 to 5. Dispersity is the ratio of weight average molecular weight to number average molecular weight, each determined by gel permeation chromatography using polystyrene standards. The poly(2,6-dimethyl-1,4-phenylene ether) prepared by the present method can also have a unimodal molecular weight distribution, i.e., a molecular weight distribution with one local maximum. This stands in contrast with the bimodal molecular weight distributions of high molecular weight poly(2,6-dimethyl-1,4-phenylene ether)s prepared by conventional methods.

The poly(2,6-dimethyl-1,4-phenylene ether) is useful for forming fibers, including solid fibers and hollow fibers. The fibers can be prepared using solution spinning or melt spinning methods. In some embodiments, the fiber composition is 50 to 100 weight percent poly(2,6-dimethyl-1,4-phenylene ether), and 0 to 50 weight percent polystyrene.

The poly(2,6-dimethyl-1,4-phenylene ether) is useful for forming articles. Suitable methods of forming such articles include single layer and multilayer sheet extrusion, injection molding, blow molding, film extrusion, profile extrusion, pultrusion, compression molding, thermoforming, pressure forming, hydroforming, vacuum forming, and the like. Combinations of the foregoing article fabrication methods can be used. Articles can incorporate the above-described fibers. For example, hollow fibers can be used to prepare a hollow fiber membrane comprising the poly(2,6-dimethyl-1,4-phenylene ether). In turn, the hollow fiber membrane can be incorporated into a gas separation unit. For an example of a gas separation unit incorporating a hollow fiber membrane, see U.S. Patent Application No. US 2010/0021360 A1 of Leenders et al. When an article is prepared by molding, the poly(2,6-dimethyl-1,4-phenylene ether) can be blended with another polymer to form a molding composition. Polymers suitable for blending with the poly(2,6-dimethyl-1,4-phenylene ether) include polystyrenes, unhydrogenated and hydrogenated block copolymers of styrene and butadiene, unhydrogenated and hydrogenated block copolymers of styrene and isoprene, polyamides, polyesters, polyolefins, and combinations thereof. The poly(2,6-dimethyl-1,4-phenylene ether) and the other polymer can be blended in a weight ratio of 5:95 to 95:5, or 10:90 to 90:10, or 20:80 to 80:20.

The invention includes at least the following embodiments.

Embodiment 1: A method of forming a poly(2,6-dimethyl-1,4-phenylene ether), comprising: reacting 2,6-dimethylphenol in the presence of toluene, oxygen, copper ion, bromide ion, and N,N'-di-tert-butylethylenediamine to form a poly(2,6-dimethyl-1,4-phenylene ether); wherein the mole ratio of 2,6-dimethylphenol to copper ion is 160:1 to 300:1, the mole ratio of N,N'-di-tert-butylethylenediamine to copper ion is 1.5:1 to 3:1, and the mole ratio of atomic oxygen to 2,6-dimethylphenol is 0.9:1 to 1.5:1.

Embodiment 2: The method of embodiment 1, wherein said reacting 2,6-dimethylphenol comprises reacting a total of 11 to 15 weight percent 2,6-dimethylphenol, based on the total of 2,6-dimethylphenol and toluene.

Embodiment 3: The method of embodiment 1 or 2, wherein the N,N'-di-tert-butylethylenediamine and the copper ion are present in a mole ratio of 1.9:1 to 4:1.

Embodiment 4: The method of any one of embodiments 1-3, wherein the poly(2,6-dimethyl-1,4-phenylene ether) has an intrinsic viscosity of 1.5 to 2.5 deciliters per gram, and an amino group content of 0.8 to 1.2 weight percent, based on the weight of the poly(2,6-dimethyl-1,4-phenylene ether).

Embodiment 5: The method of any one of embodiments 1-4, wherein the poly(2,6-dimethyl-1,4-phenylene ether) has a dispersity of 2.5 to 6.

Embodiment 6: The method of embodiment 1, wherein the mole ratio of 2,6-dimethylphenol to copper ion is 180:1 to 250:1, the mole ratio of N,N'-di-tert-butylethylenediamine to copper ion is 1.9:1 to 2.2:1, the mole ratio of atomic oxygen to 2,6-dimethylphenol is 1.2:1 to 1.4:1, and the poly(2,6-dimethyl-1,4-phenylene ether) has an intrinsic viscosity of 1.5 to 2.5 deciliters per gram, and an incorporated amine content of 0.8 to 1.2 weight percent.

Embodiment 7: A poly(2,6-dimethyl-1,4-phenylene ether) having an intrinsic viscosity of 1.5 to 2.5 deciliters per gram, and an amino group content of 0.8 to 1.2 weight percent, based on the weight of the poly(2,6-dimethyl-1,4-phenylene ether).

Embodiment 8: The poly(2,6-dimethyl-1,4-phenylene ether) of embodiment 7, having a dispersity of 2.5 to 6.

Embodiment 9: The poly(2,6-dimethyl-1,4-phenylene ether) of embodiment 7 or 8, having a unimodal molecular weight distribution.

Embodiment 10: A fiber comprising the poly(2,6-dimethyl-1,4-phenylene ether) of any one of embodiments 7 to 9.

Embodiment 11: The fiber of embodiment 10, wherein the fiber is a hollow fiber.

Embodiment 12: An article comprising the poly(2,6-dimethyl-1,4-phenylene ether) of any one of embodiments 7 to 9.

Embodiment 13: The article of embodiment 12, wherein the article is a hollow fiber membrane comprising the poly(2,6-dimethyl-1,4-phenylene ether).

Embodiment 14: The article of embodiment 12, wherein the article is a gas separation unit comprising a hollow fiber membrane comprising the poly(2,6-dimethyl-1,4-phenylene ether).

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

EXAMPLE 1, COMPARATIVE EXAMPLES 1 AND 2

Components used in the working examples are summarized in Table 1.

TABLE 1

| Component | Description |
|---|---|
| DMP | 2,6-Dimethylphenol (2,6-xylenol), CAS Reg. No. 576-26-1, 99.9% pure; obtained from Acros Organics. |
| $Cu_2O$ | Cuprous oxide, CAS Reg. No. 1317-39-1; obtained from American Chemet. |
| HBr | Hydrobromic acid, CAS Reg. No. 10035-10-6; obtained as a 46 weight percent solution in water from Chemtura. |
| DBEDA | N,N'-di-tert-butylethylenediamine, CAS Reg. No. 4062-60-6; obtained from Achiewell. |
| DBA | N,N-di-n-butylamine, CAS Reg. No. 111-92-2; obtained from Tampico. |
| DMBA | N,N-dimethylbutylamine, CAS Reg. No. 927-62-8; obtained from Oxea. |
| QUAT | N,N,N'N'-Didecyldimethyl ammonium chloride, CAS Reg. No. 7173-51-5; obtained from Pilot Chemical. |
| NTA | Nitrolotriacetic acid trisodium salt, CAS Reg. No. 5064-31-3; obtained from Ascend. |
| Toluene | Toluene, CAS Reg. No. 108-33-3; obtained from Acros Organics. |

Analysis of poly(phenylene ether) by proton nuclear magnetic resonance spectroscopy ($^1H$ NMR). $^1H$ NMR analysis of solutions prepared from isolated poly(phenylene ether) solid samples were used to determine the weight percentage of tetramethylbiphenyl group incorporated into the polymer framework, and the extent of N,N-di-n-butylamine (DBA) incorporation at the terminal, internal, and cyclic positions. $^1H$-NMR analysis of liquid samples established the amount of 3,3',5,5'-tetramethyldiphenoquinone (TMDQ) present in the liquid phase. Sample preparation for the solid samples entails dissolving 0.06 gram of polymer in $CDCl_3$ (deuterated chloroform), whereas in the case of liquid samples 0.5 milliliter of polymer solution is diluted in 5 milliliters of $CDCl_3$, and of this 5.5 milliliters, 1 milliliter is used for the test.

Pre-Pilot Scale Polymerization Reaction Procedure. The pre-pilot scale reactor was a one gallon stainless steel vessel. The total solids loading was 7 weight percent. As used herein, the terms "solids loading" and "percent solids" refers to the weight percent of DMP based on the total weight of DMP and toluene. Approximately 10% of the total toluene solution of monomer was present in the reactor at the beginning of the reaction with the remaining solution added to the reactor over the course of 45 minutes. The copper ion concentration was varied. A copper ion solution was prepared by dissolving $Cu_2O$ (0.37 grams, 0.005 moles copper ion) in a 46 weight percent aqueous solution of hydrobromic acid (2.28 grams, 028 moles bromide ion). In Table 2, "Cu (% TM)" is the loading of copper ion solution expressed as weight percent of total monomer. "DMP:Cu mole ratio" is the mole ratio of DMP to copper. The DBA loading 4.05 weight percent based on total monomer (3.18 grams). The DMBA loading was 1 weight percent based on total monomer (9.53 grams). The DBEDA loading was 30 weight percent based on the weight of the copper ion solution. The QUAT loading was 5 weight percent based on the weight of the copper ion solution. Molecular oxygen was sparged into the reaction mixture via a dip tube at 10.675 standard liters per hour (0.377 standard cubic feet per hour (SCFH); oxygen and DMP were added to the reaction mixture in a constant mole ratio of atomic oxygen to DMP of 1.31:1). Throughout the reaction, nitrogen (32.00 standard liters per hour; 1.13 SCFH) was added to the reactor to reduce the oxygen concentration in the gas phase. The reaction was gradually heated from maintained at room temperature (23° C.) during the exothermic stage. During the build stage, the temperature was gradually heated from 23° C. to 48° C. Copper ion was chelated with trisodium nitrilotriacetate at the end of the build phase, terminating the oxidative polymerization reaction. The reaction mixture was transferred to a jacketed glass vessel and allowed to equilibrate for 185 minutes. The temperature of the mixture during the equilibration stage was 62° C.

Table 2 summarizes varied reaction conditions and properties of the product poly(phenylene ether). "Cu (ppm)" is the copper content of the poly(phenylene ether), determined by atomic absorption spectroscopy, and expressed in units of parts per million by weight based on the weight of poly (phenylene ether). "IV (dL/g)" is intrinsic viscosity, expressed in units of deciliter per gram, determined by Ubbelohde viscometer at 25° C. in chloroform solution. Weight average molecular weight ("Mw (g/mol)") and number average molecular weight ("Mn (g/mol)"), each expressed in units of grams/mole, were determined according to gel permeation chromatography using polystyrene standards. Dispersity, which is unitless, is weight average molecular weight divided by number average molecular weight. "Biphenyl (wt %)" is the sum of the weight percent of internal biphenyl groups having the structure

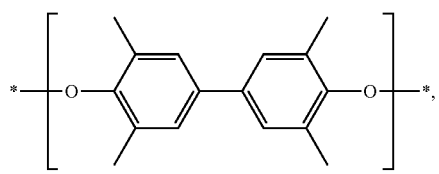

and the weight percent of terminal biphenyl groups having the structure

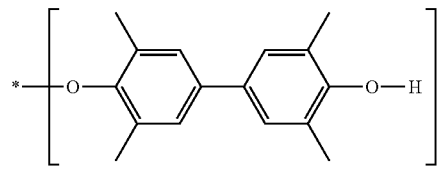

in the poly(phenylene ether), wherein weight percent values are based on the weight of the poly(phenylene ether). "Terminal DBA (wt %)" is the weight percent of di-n-butylamino groups bound to phenoxy residues terminal to poly(phenylene ether) chains, based on the weight of the poly(phenylene ether). "Internal DBA (wt %)" is the weight percent of di-n-butylamino groups bound to phenoxy residues internal to poly(phenylene ether) chains, based on the weight of the poly(phenylene ether). "MBA (wt %)" is the weight percent of mono-n-butylamino groups bound to internal or terminal phenoxy residues of poly(phenylene ether) chains, based on the weight of the poly(phenylene ether). It will be understood that in the case of the incorporate DBA and MBA groups, the weight percent of amino groups is based on the amino groups alone, and does not include the weight of the phenoxy residues to which they are bound.

The results in Table 2 show that each of the processes produced high molecular weight poly(phenylene ether). However, relative to the processes of Comparative Examples 1 and 2, the Example 1 process with a higher DMP:Cu mole ratio produced a poly(phenylene ether) with substantially less residual copper (3.5 ppm, versus values of 14 and 25 ppm), and a significantly narrower molecular weight distribution (Dispersity value of 2.80, versus values of 3.45 and 3.22).

TABLE 2

| | Ex. 1 | C. Ex. 1 | C. Ex. 2 |
|---|---|---|---|
| REACTION CONDITIONS | | | |
| Cu solution (% TM) | 3.56 | 7.05 | 6.30 |
| DMP:Cu mole ratio | 224:1 | 114:1 | 126:1 |
| PPE PROPERTIES | | | |
| Cu (ppm) | 3.5 | 14 | 25 |
| IV (dL/g) | 0.838 | 0.810 | 0.928 |
| Mw (g/mol) | 116,690 | 165,610 | 141,150 |
| Mn (g/mol) | 41,612 | 48,050 | 43,814 |
| Dispersity | 2.80 | 3.45 | 3.22 |
| Biphenyl (wt %) | 0.103 | 0.111 | 0.099 |
| Terminal DBA (wt %) | 0.229 | 0.177 | 0.219 |
| Internal DBA (wt %) | 0.497 | 0.831 | 0.704 |
| MBA (wt %) | 0.133 | 0.142 | 0.147 |

EXAMPLES 2 AND 3, COMPARATIVE EXAMPLES 3 AND 4

These examples illustrate the effects of the mole ratio of atomic oxygen to 2,6-dimethylphenol. The results are present in Tables 3-6, corresponding to mole ratios of atomic oxygen to 2,6-dimethylphenol of 1.00:1 (Comparative Example 3), 1.31:1 (Example 2), 0.72:1 (Comparative 4), and 1.31:1 (Example 3). The mole ratio of atomic oxygen to 2,6-dimethylphenol was varied by adjusting the flow of molecular oxygen into the reactor. The reaction conditions held constant were a percent solids of 7 weight percent, a copper ion solution loading of 7.05 weight percent based on total monomer, a DMBA loading of 1.00 weight percent based on total monomer, a DBA loading of 4.05 weight percent based on total monomer, a DBEDA loading of 34.81 weight percent, based on the total weight of the copper ion solution, an exothermic stage temperature of 25° C. and time of 57 minutes, and a build stage temperature of 48° C. and time of 70 minutes. In Tables 3-6, "Time (min)" is the elapsed time of the equilibration stage, which follows the build stage and is characterized by a temperature of 62° C. "Cyclic DBA (wt %)" is the weight percent of

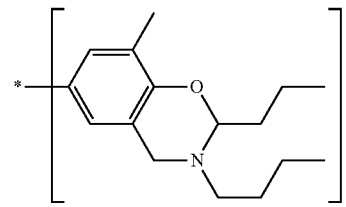

groups, based on the weight of the poly(phenylene ether).

The results in Tables 3-6 show that among the three O:DMP ratios tested, a ratio of 1.00:1 produced the highest intrinsic viscosities. A ratio of 1.31:1 produced—by far—the highest amine incorporation, while still providing a high intrinsic viscosity and maintaining a relatively low dispersity.

TABLE 3

| | | | | Mole Ratio O:DMP = 1.00:1 | | | |
|---|---|---|---|---|---|---|---|
| Time (min) | IV (dL/g) | Mw (g/mol) | Mn (g/mol) | Dispersity | Biphenyl (wt %) | Term. DBA (wt %) | Internal DBA (wt %) | Cyclic DBA (wt %) |
| 130 | 2.056 | 466950 | 114420 | 4.08 | 0.050 | 0.063 | 0.33 | 0.049 |
| 160 | 2.077 | 472400 | 111000 | 4.26 | 0.055 | 0.076 | 0.37 | 0.057 |
| 190 | 2.007 | 452870 | 94676 | 4.78 | 0.092 | 0.077 | 0.34 | 0.054 |
| 220 | 1.98 | 438210 | 78678 | 5.57 | 0.165 | 0.098 | 0.37 | 0.065 |
| 250 | 1.91 | 400640 | 60712 | 6.60 | 0.258 | 0.104 | 0.33 | 0.070 |
| 280 | 1.76 | 364600 | 49934 | 7.30 | 0.348 | 0.113 | 0.28 | 0.083 |
| 320 | 1.58 | 338300 | 41779 | 8.10 | 0.463 | 0.128 | 0.29 | 0.104 |

TABLE 4

| | | | | Mole Ratio O:DMP = 1.31:1 | | | |
|---|---|---|---|---|---|---|---|
| Time (min) | IV (dL/g) | Mw (g/mol) | Mn (g/mol) | Dispersity | Biphenyl (wt %) | Term. DBA (wt %) | Internal DBA (wt %) | Cyclic DBA (wt %) |
| 130 | 1.503 | 316770 | 79112 | 4.00 | 0.0507 | 0.1538 | 0.8265 | 0.0717 |
| 160 | 1.545 | 329630 | 77620 | 4.25 | 0.0634 | 0.1417 | 0.7369 | 0.0604 |
| 190 | 1.487 | 300570 | 70422 | 4.27 | 0.0953 | 0.1529 | 0.7831 | 0.0789 |
| 220 | 1.512 | 332380 | 66765 | 4.98 | 0.1449 | 0.1399 | 0.6891 | 0.0497 |
| 250 | 1.396 | 268650 | 54194 | 4.96 | 0.2094 | 0.1632 | 0.6719 | 0.0723 |
| 280 | 1.384 | 275630 | 50214 | 5.49 | 0.2708 | 0.1687 | 0.6208 | 0.0657 |
| 320 | 1.293 | 258480 | 43894 | 5.89 | 0.3674 | 0.1870 | 0.6410 | 0.0765 |
| 920 | 1.310 | 256160 | 40518 | 6.32 | 0.4244 | 0.1759 | 0.5659 | 0.0642 |

TABLE 5

Mole Ratio O:DMP = 0.72:1

| Time (min) | IV (dL/g) | Mw (g/mol) | Mn (g/mol) | Dispersity | Biphenyl (wt %) | Term. DBA (wt %) | Internal DBA (wt %) | Cyclic DBA (wt %) |
|---|---|---|---|---|---|---|---|---|
| 130 | 1.892 | 430010 | 103110 | 4.17 | 0.0873 | 0.0851 | 0.3953 | 0.0621 |
| 160 | 1.876 | 428500 | 97735 | 4.38 | 0.1311 | 0.0713 | 0.3572 | 0.0555 |
| 190 | 1.802 | 405180 | 84120 | 4.82 | 0.1465 | 0.0886 | 0.3801 | 0.0765 |
| 220 | 1.702 | 372960 | 69162 | 5.39 | 0.2211 | 0.0989 | 0.3314 | 0.0826 |
| 250 | 1.589 | 338980 | 54621 | 6.21 | 0.3603 | 0.1136 | 0.3016 | 0.0780 |
| 280 | 1.489 | 303010 | 44248 | 6.85 | 0.4544 | 0.1371 | 0.2975 | 0.0939 |
| 320 | 1.354 | 266440 | 35066 | 7.60 | 0.6077 | 0.1559 | 0.2665 | 0.1167 |
| 920 | 1.170 | 206140 | 21738 | 9.48 | 0.9829 | 0.1880 | 0.2645 | 0.1759 |

TABLE 6

Mole Ratio O:DMP = 1.31:1

| Time (min) | IV (dL/g) | Mw (g/mol) | Mn (g/mol) | Dispersity | Biphenyl (wt %) | Term. DBA (wt %) | Internal DBA (wt %) | Cyclic DBA (wt %) |
|---|---|---|---|---|---|---|---|---|
| 130 | 1.459 | 302090 | 77430 | 3.90 | 0.0988 | 0.1410 | 0.8103 | 0.0606 |
| 160 | 1.560 | 332520 | 80427 | 4.13 | 0.0729 | 0.1600 | 0.8329 | 0.0592 |
| 190 | 1.511 | 315350 | 71854 | 4.39 | 0.0923 | 0.1599 | 0.7949 | 0.0656 |
| 220 | 1.470 | 307700 | 63504 | 4.85 | 0.1542 | 0.1749 | 0.8158 | 0.0783 |
| 250 | 1.428 | 285030 | 55989 | 5.09 | 0.3312 | 0.1882 | 0.7785 | 0.0831 |
| 280 | 1.335 | 269180 | 49255 | 5.47 | 0.2849 | 0.1935 | 0.7484 | 0.0866 |
| 320 | 1.337 | 272340 | 44523 | 6.12 | 0.3757 | 0.2138 | 0.7292 | 0.0886 |
| 350 | 1.295 | 251970 | 40656 | 6.20 | 0.4181 | 0.2253 | 0.7273 | 0.1047 |
| 920 | 1.140 | 212590 | 28310 | 7.51 | 0.684 | 0.2364 | 0.6520 | 0.1460 |

EXAMPLES 4 AND 5

These examples illustrate the effects of varying percent solids, which is the weight percent of total monomer (2,6-dimethylphenol) based on the sum of monomer and toluene. The following reaction conditions were held constant: an O:DMP mole ratio of 1:1, a copper ion solution loading of 8 weight percent of total monomer, a DMP:Cu mole ratio of 218:1; a DMBA loading of 1 weight percent of total monomer, a DBA loading of 4.05 weight percent of total monomer, a DBEDA loading of 34.81 weight percent based on the weight of copper ion solution, an exothermic stage temperature of 25° C. and time of 70 minutes, and a build stage temperature of 48° C. and time of 57 minutes.

Results as a function of reaction time are presented in Table 7 (Comparative Example 5, 9% solids) and Table 8 (Example 4, 11% solids). In Tables 7 and 8, "Time (min)" is the elapsed time of the equilibration stage, which follows the build stage and is characterized by a temperature of 28° C. The results show that it is possible to produce poly(phenylene ether) with intrinsic viscosity and high amine incorporation at a percent solids levels greater than 7 percent.

TABLE 7

Nine Percent Solids

| Time (min) | IV (dL/g) | Mw (g/mol) | Mn (g/mol) | Dispersity | Biphenyl (wt %) | Term. DBA (wt %) | Internal DBA (wt %) | Cyclic DBA (wt %) |
|---|---|---|---|---|---|---|---|---|
| 157 | 2.22 | 539,640 | 116,460 | 4.63 | 0.050 | 0.078 | 0.44 | 0.050 |
| 230 | 2.19 | 537,890 | 102,210 | 5.26 | 0.070 | 0.089 | 0.45 | 0.056 |
| 290 | 2.17 | 536,430 | 91,047 | 5.89 | 0.122 | 0.094 | 0.44 | 0.068 |
| 350 | 1.99 | 487,070 | 69,234 | 7.04 | 0.265 | 0.111 | 0.40 | 0.073 |

TABLE 8

| | | | | | | Term. | Internal | Cyclic |
| Time (min) | IV (dL/g) | Mw (g/mol) | Mn (g/mol) | Dispersity | Biphenyl (wt %) | DBA (wt %) | DBA (wt %) | DBA (wt %) |
| --- | --- | --- | --- | --- | --- | --- | --- | --- |
| 157 | 2.14 | 454,680 | 57,738 | 7.87 | 0.074 | 0.076 | 0.45 | 0.051 |
| 230 | 2.11 | 472,780 | 74,410 | 6.35 | 0.079 | 0.083 | 0.44 | 0.052 |
| 290 | 2.00 | 438,130 | 75,166 | 5.83 | 0.137 | 0.105 | 0.41 | 0.058 |
| 350 | 1.78 | 367,100 | 60,903 | 6.03 | 0.265 | 0.141 | 0.36 | 0.074 |

Table 8 header: Eleven Percent Solids

EXAMPLE 5, COMPARATIVE EXAMPLE 6

Figure 2:
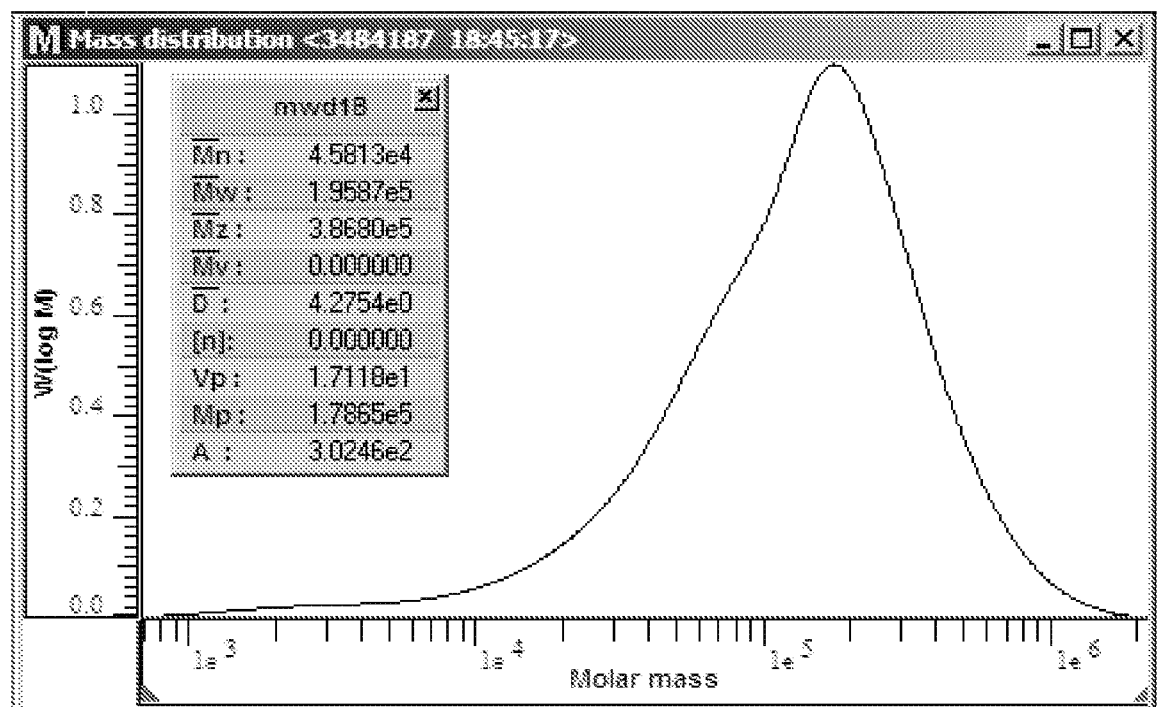
FIG. 2 is a gel permeation chromatogram showing the molecular weight distribution of an inventive poly(2,6-dimethyl-1,4-phenylene ether).

These examples further illustrate the effect of O:DMP mole ratio. In Comparative Example 6, the O:DMP mole ratio was 0.8:1, and in Example 5 it was 1.3:1. The reaction conditions held constant were a percent solids of 7 weight percent, a copper ion solution loading of 7 weight percent based on total monomer, a DMP:Cu mole ratio of 218:1, a DMBA loading of 1 weight percent based on total monomer, a DBA loading of 4.05 weight percent based on total monomer, a DBEDA loading of 34.81 weight percent based on the total weight of the copper ion solution, an exothermic stage temperature of 25° C. and time of 70 minutes, a build stage temperature of 48° C. and time of 57 minutes, and an equilibration stage temperature of 62° C. The Example 5 poly(phenylene ether) was isolated by precipitation in methanol after 740 minutes of equilibration (the equilibration was essentially complete after 70 minutes, but was extended to observe the intrinsic viscosity change over time). The Comparative Example 6 poly(phenylene ether) was similarly isolated after 740 minutes of equilibration. Molecular weight distributions for the Comparative Example 6 and Example 5 poly(phenylene ether)s are presented in FIGS. 1 and 2, respectively. The Comparative Example 6 poly(phenylene ether) exhibits a bimodal molecular weight distribution with a dispersity of 14.4. The Example 5 poly(phenylene ether) exhibits a monomodal molecular weight distribution with a dispersity of 4.28.

The invention claimed is:

1. A method of forming a poly(2,6-dimethyl-1,4-phenylene ether), comprising:
reacting 2,6-dimethylphenol in the presence of toluene, oxygen, copper ion, bromide ion, and N,N'-di-tert-butylethylenediamine to form a poly(2,6-dimethyl-1,4-phenylene ether);
wherein
the mole ratio of 2,6-dimethylphenol to copper ion is 160:1 to 300:1,
the mole ratio of N,N'-di-tert-butylethylenediamine to copper ion is 1.5:1 to 3:1, and
the mole ratio of atomic oxygen to 2,6-dimethylphenol is 0.9:1 to 1.5:1.

2. The method of claim 1, wherein said reacting 2,6-dimethylphenol comprises reacting a total of 11 to 15 weight percent 2,6-dimethylphenol, based on the total of 2,6-dimethylphenol and toluene.

3. The method of claim 1, wherein the N,N'-di-tert-butylethylenediamine and the copper ion are present in a mole ratio of 1.9:1 to 4:1.

4. The method of claim 1, wherein the poly(2,6-dimethyl-1,4-phenylene ether) has an intrinsic viscosity of 1.5 to 2.5 deciliters per gram, and an amino group content of 0.8 to 1.2 weight percent, based on the weight of the poly(2,6-dimethyl-1,4-phenylene ether).

5. The method of claim 1, wherein the poly(2,6-dimethyl-1,4-phenylene ether) has a dispersity of 2.5 to 6.

6. The method of claim 1, wherein
the mole ratio of 2,6-dimethylphenol to copper ion is 180:1 to 250:1,
the mole ratio of N,N'-di-tert-butylethylenediamine to copper ion is 1.9:1 to 2.2:1,
the mole ratio of atomic oxygen to 2,6-dimethylphenol is 1.2:1 to 1.4:1, and
the poly(2,6-dimethyl-1,4-phenylene ether) has an intrinsic viscosity of 1.5 to 2.5 deciliters per gram, and an incorporated amine content of 0.8 to 1.2 weight percent.

7. A poly(2,6-dimethyl-1,4-phenylene ether) having an intrinsic viscosity of 1.5 to 2.5 deciliters per gram, an amino group content of 0.8 to 1.2 weight percent, based on the weight of the poly(2,6-dimethyl-1,4-phenylene ether), and a dispersity of 2.5 to 6.

8. The poly(2,6-dimethyl-1,4-phenylene ether) of claim 7, having a unimodal molecular weight distribution.

9. A fiber comprising the poly(2,6-dimethyl-1,4-phenylene ether) of claim 7.

10. The fiber of claim 9, wherein the fiber is a hollow fiber.

11. An article comprising the poly(2,6-dimethyl-1,4-phenylene ether) of claim 7.

12. The article of claim 11, wherein the article is a hollow fiber membrane comprising the poly(2,6-dimethyl-1,4-phenylene ether).

13. The article of claim 11, wherein the article is a gas separation unit comprising a hollow fiber membrane comprising the poly(2,6-dimethyl-1,4-phenylene ether).

* * * * *